United States Patent [19]
Poulin

[11] Patent Number: 5,782,695
[45] Date of Patent: Jul. 21, 1998

[54] AXIALLY FIXED HOMOKINETIC TRANSMISSION JOINT HAVING A SLEEVE WITH CENTERING LUGS ENGAGED WITH SPHERICAL WALL SURFACES OF A DRIVING BARREL

[75] Inventor: Bernard Poulin, Conflans-Sainte-Honorine, France

[73] Assignee: GKN Automotive AG, Lohmar, Germany

[21] Appl. No.: 419,703

[22] Filed: Apr. 11, 1995

[30] Foreign Application Priority Data

Jun. 23, 1994 [FR] France ................... 94 07734

[51] Int. Cl.[6] ................................................ F16D 3/26
[52] U.S. Cl. .................................... 464/111; 464/124
[58] Field of Search .......................... 464/111, 905, 464/120, 123, 124, 182, 145, 146; 403/359

[56] References Cited

U.S. PATENT DOCUMENTS

| | | | |
|---|---|---|---|
| 2,859,597 | 11/1958 | Boigenzohn | 464/123 |
| 3,975,922 | 8/1976 | Orain | 464/905 X |
| 4,417,880 | 11/1983 | Kumagai et al. | 464/123 X |
| 4,764,153 | 8/1988 | Jacob | 464/905 X |
| 5,207,616 | 5/1993 | Moulinet | 464/905 X |

FOREIGN PATENT DOCUMENTS

| | | | |
|---|---|---|---|
| 1440784 | 4/1965 | France . | |
| 2391389 | 12/1978 | France . | |
| 2 833 221 | 2/1979 | Germany | 464/111 |
| 41 37 988 | 12/1992 | Germany . | |
| 1 594 333 | 7/1981 | United Kingdom | 464/123 |
| 2 090 374 | 7/1982 | United Kingdom . | |
| 2 093 161 | 8/1982 | United Kingdom . | |

*Primary Examiner*—Donald P. Walsh
*Assistant Examiner*—William A. Rivera
*Attorney, Agent, or Firm*—Wenderoth, Lind & Ponack, L.L.P.

[57] ABSTRACT

An axially fixed homokinetic tripod joint for high-speed motor vehicle transmission has a tube (2) constituting a transmission shaft connected to a sleeve (26) in which extends a stem (6) provided at its end with a tripod element (10) cooperative with an adapted barrel (20) carried by a complementary transmission shaft. The sleeve (26) has at its free end three centering lugs (34A) which have an outer spherical surface and which cooperate with a spherical central cavity in the barrel (20) for providing an axially fixed and articulated assembly of the joint.

11 Claims, 3 Drawing Sheets

AXIALLY FIXED HOMOKINETIC TRANSMISSION JOINT HAVING A SLEEVE WITH CENTERING LUGS ENGAGED WITH SPHERICAL WALL SURFACES OF A DRIVING BARREL

BACKGROUND OF THE INVENTION

The present invention relates to an axially fixed articulated homokinetic transmission joint, in particular for a motor vehicle.

The invention more particularly relates to an articulated homokinetic transmission joint of the type comprising a tripod element provided with three trunnions carrying rotative rollers and a driving barrel comprising three pairs of raceways spaced apart on the periphery of a central cavity of the driving barrel with respect to which the tripod element is capable of undergoing slight radial eccentricities due to the angular operation of the joint. The tripod element is carried by a stem connected to rotate with a driving or receiving shaft, the stem extending substantially axially in a sleeve which is connected to the shaft at a first end and has at its second end an outwardly spherical bell mouth provided with three recesses defining clearances for the three rollers of the tripod element. The recesses define on the outwardly spherical bell mouth three lugs for radially centering the sleeve in the central cavity of the driving barrel.

Many axially fixed transmission joints are known in which a means for axially immobilizing a first shaft relative to a second shaft in the direction corresponding to their relative motions toward and away from each other is adapted for shafts rotating with large operating angles, on the order of 10° to 12°, but at relatively low speeds, or rotating at high speeds, but with relatively small operating angles.

The use of tripod joints as high-speed transmission joints is of interest in many applications owing to their high power transmitting capacity, their high efficiency, and their perfectly homokenetic character. However, their use has been limited to applications involving relatively small operating angles, since the tripod joint, by its very design, is subjected at high speed to cyclic radial excitations in the stem carrying the tripod element due to the eccentric rotation of the revolving masses connected to the tripod element. These cyclic radial excitations may give rise to unpleasant vibrations in the device in which the joint is mounted, for example the transmission of a motor vehicle.

Document FR-A-1 440 784 discloses a homokinetic transmission joint of the aforementioned type which provides a solution to this problem of cyclic radial excitations. However, this homokenetic joint is of the sliding type, and only permits high-speed transmission of rotation at a relatively small angle between the two transmission shafts, owing to the sliding. Moreover, this joint becomes rapidly worn.

Now, in practice, in particular in the design of a transmission for a motor vehicle, it is often necessary to employ an axially fixed homokinetic transmission joint.

SUMMARY OF THE INVENTION

An object of the invention is to provide an articulated homokinetic transmission joint which permits high-speed operation at large operating angles without giving rise to cyclic radial vibrations in the shaft connected to the tripod element and which is axially fixed. The invention therefore provides an axially fixed articulated homokinetic transmission joint of the aforementioned type, characterized in that the central cavity of the barrel comprises three spherical wall portions cooperative with the centering lugs of the sleeve for axially positioning, in a ball joint manner, the tripod element relative to the barrel.

The invention may also have one of the following advantageous features:

- the barrel is open on a side remote from the shaft to permit placing the tripod element in position in the barrel when the lugs of the sleeve are engaged on the spherical wall portions of the cavity;
- the barrel carries a removable fluidtight cap, which may be for example set in position on the barrel and covers the opening of the barrel provided for inserting the tripod element in the barrel;
- the tripod element is carried by a splined end of the stem, the opposite end of the stem being connected to the shaft;
- the tripod is in one piece with the stem;
- the stem is provided at one of its ends with splines which are cooperative with complementary inner splines in the sleeve for their interconnection in rotation;
- the splines of the stem have a crowned profile permitting an angular movement of the stem relative to the sleeve;
- the joint comprises means for resiliently pressing the splined end of the stem against an inner shoulder of the sleeve;
- the cap has a pressure-applying region formed by an inwardly projecting deformation of the cap which resiliently acts on the unsplined end of the stem along the axis thereof; and
- a circular ring is interposed between the splined end of the stem and the shoulder of the sleeve.

BRIEF DESCRIPTION OF THE DRAWINGS

A better understanding of the invention will be had from the following description which is given solely by way of example, and with reference to the drawings, in which.

DETAILED DESCRIPTION OF THE PREFERRED EMBODIMENT

Figure 1:
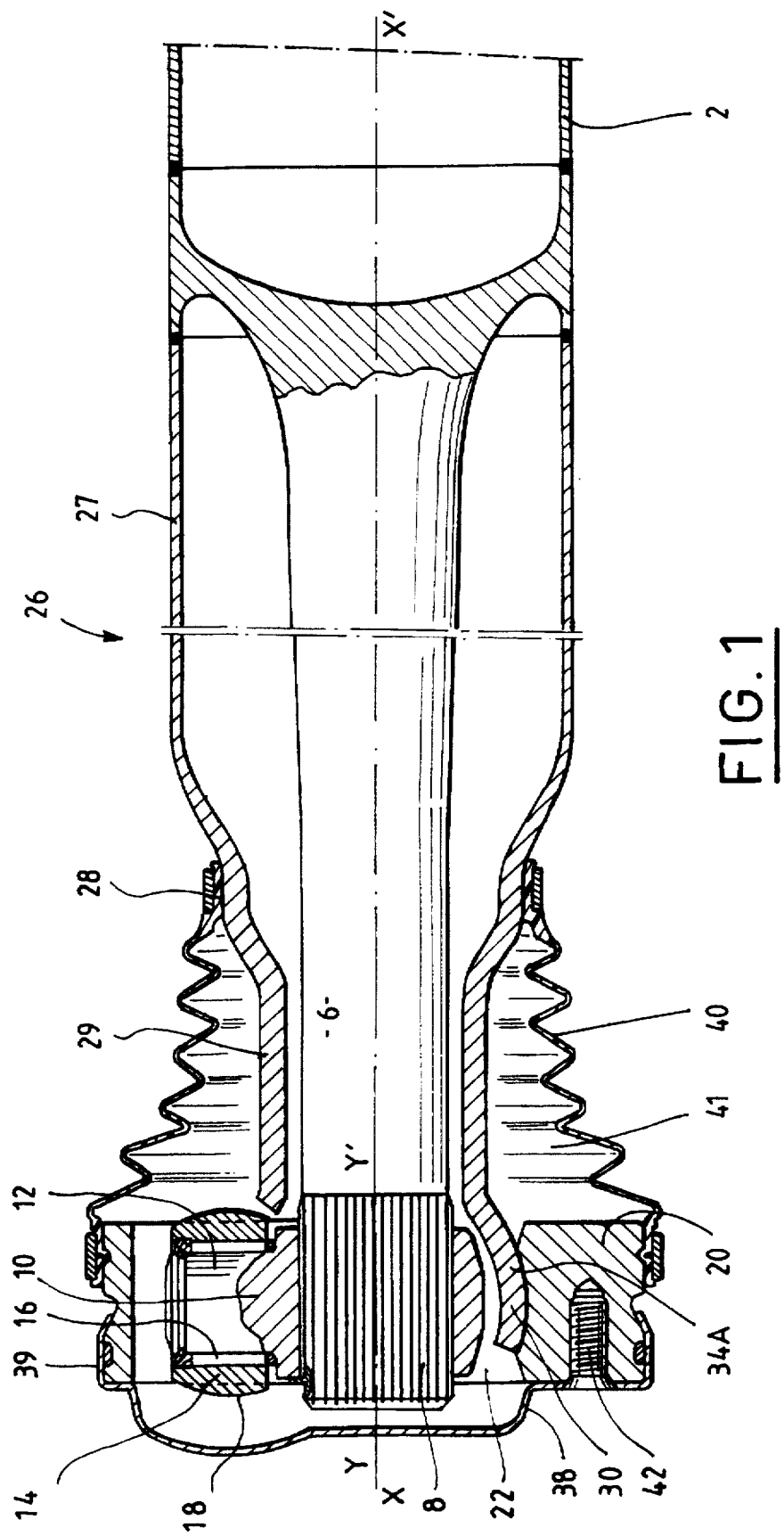
FIG. 1 is a longitudinal sectional view of a first embodiment of a joint according to the invention.

In a first embodiment shown in FIG. 1, a tube 2 forming a transmission shaft is axially welded to a cylindrical enlarged portion 4 which has the same diameter as the tube 2 and is in one piece with a stem 6. The stem 6 extends along the same axis X—X' as the tube 2. The stem 6 has at its free end a splined portion 8 on which the hub of a tripod element 10 is mounted.

In a conventional manner, the tripod element 10 comprises three radial trunnions 12 evenly spaced 120° apart around the axis of rotation X—X' of the stem 6 carrying the tripod element. Each trunnion 12 has a cylindrical lateral outer surface whose axis intersects and is perpendicular to the axis of rotation X—X' of the tripod element. Each trunnion 12 receives a roller 14 which is rotatively and slidably mounted on a needle bearing 16. The rollers 14 have a spherical outer surface 18.

A driving barrel 20, having the general shape of a thick disc and an axis Y—Y', is connected to a second transmission shaft (not shown in FIGS. 1 and 2), and is the complementary part of the joint. The barrel 20 shown in FIG. 3 has an axial central cavity 22 around which there are provided, evenly spaced 120° apart, three pairs of raceways 24A, 24B and 24C. These raceways are formed by three cylindrical bores opening onto the two end faces of the barrel 20 and communicating in the direction of the axis Y—Y' with the central cavity 22. The axes of these three bores are parallel to the axis Y—Y'.

The raceways 24A, 24B, 24C constitute tracks for the rollers 14 of the tripod element 10. The latter is mainly contained within the barrel 20. The splined portion 8 of the stem 6 extends through the central cavity 22 of the barrel 20.

A sleeve 26 having an axis X—X' surrounds the stem 6 and is welded at one of its ends to the cylindrical enlargement 4 of the stem 6. The sleeve 26 has in succession, starting at the enlarged portion 4, a section 27 of the same diameter as the enlarged portion 4, a section 28 of a smaller intermediate diameter, and then a narrowed section 29 extended by an outwardly spherical bell mouth 30 constituting the free end of the sleeve.

Figure 4:
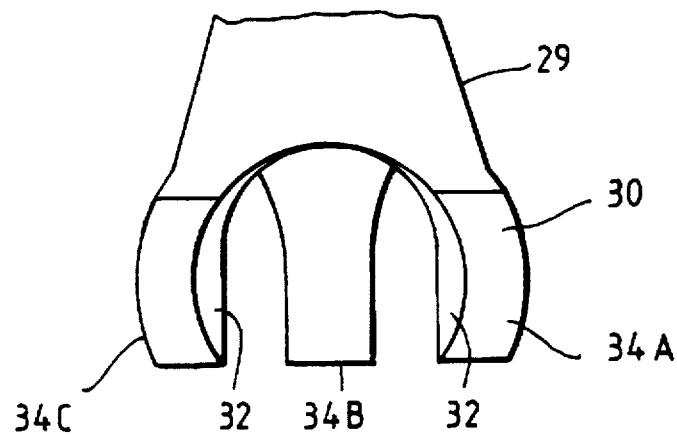
FIG. 4 is a partial side elevational view of a radial centering element of the joint shown in FIGS. 1 or 2.

As can be seen in FIG. 4, the spherical bell mouth 30 of the sleeve 26 has three longitudinal recesses 32 defining three centering lugs 34A, 34B and 34C. The three centering lugs 34A, 34B and 34C therefore have outer surfaces consisting of portions of the same sphere. The recesses 32 constitute clearances for the rollers 14 of the tripod element 10.

Figure 3:
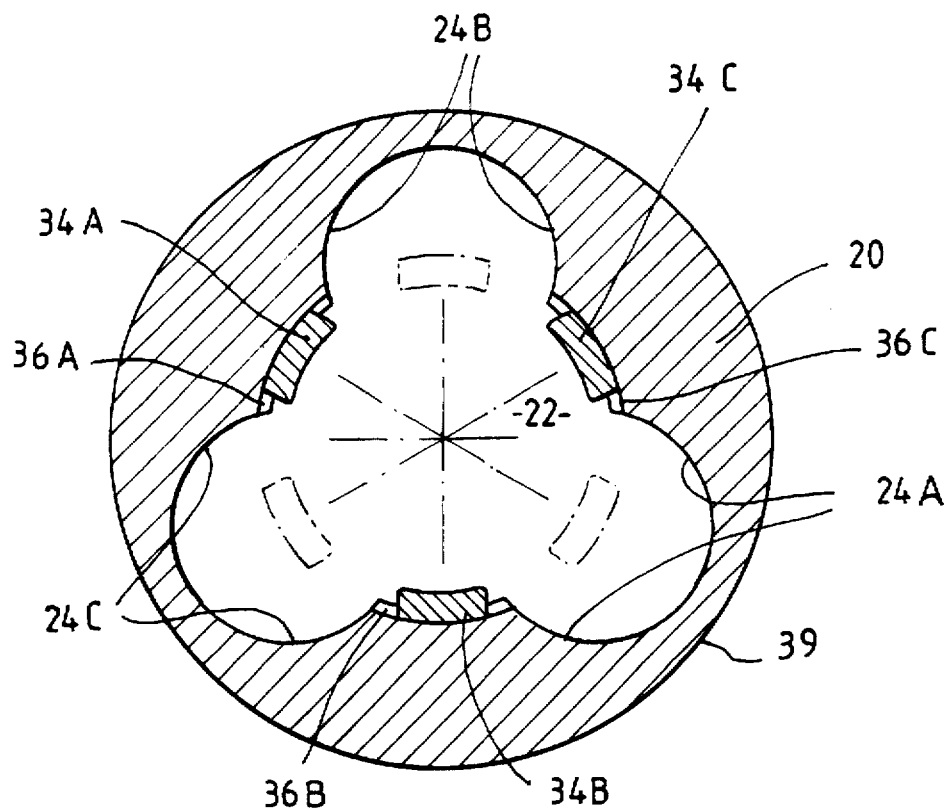
FIG. 3 is a cross-sectional view of the barrel of the joint shown in FIGS. 1 or 2.

As shown in FIG. 3, the centering lugs 34A, 34B, 34C cooperate with conjugate spherical wall portions 36A, 36B, 36C of the central cavity 22 of the barrel 20. These spherical wall portions 36A, 36B, 36C of the central cavity 22 are delimited on each side by the raceways 24A, 24B, 24C for the rollers of the tripod element and are respectively opposite the latter relative to the center of the barrel 20.

The guiding lugs 34A, 34B, 34C, having a spherical outer surface cooperate with the spherical wall portions 36A, 36B, 36C of the cavity 22 and constitute a ball joint which affords articulation and axial fixing of the sleeve 26 relative to the barrel 20, and therefore of the tube 2 relative to the complementary transmission shaft (not shown).

The sleeve 26 has a high radial rigidity and constrains the tube 2 to rotate in a perfectly centered manner about the axis X—X' without sensitivity to the cyclic radial excitations transmitted through the tripod element 10 to the stem 6, which is less rigid as concerns bending than the sleeve 26.

A fluidtight cap 38 set or formed over onto the periphery of the lateral wall 39 of the barrel 20 seals the joint by covering the face of the barrel remote from the tube 2. This cap defines, with a bellows 40 extending from the lateral wall 39 of the barrel 20 to the portion 28 of intermediate diameter of the sleeve 26, a sealed space 41 in which a lubricant is retained for the moving parts of the joint.

Tapped holes 42 are provided on the face of the barrel 20 remote from the tube 2 to permit axial fixing by means of screws of the complementary transmission shaft (not shown) of the joint.

To assemble the joint, with the tripod element 10 not yet mounted on the stem 6, the free end of the sleeve 26 is placed in the barrel 20 by inserting with a large circumferential clearance the guiding lugs 34A, 34B, 34C in the cylindrical bores delimiting the raceways 24A, 24B, 24C, as shown in dot-dash lines in FIG. 3. The sleeve is then turned relative to the barrel 20 about the axis X—X' so that the guiding lugs of the sleeve come into contact with the spherical wall portions 36A, 36B, 36C of the barrel 20, which have a complementary shape. The tripod element 10 is maintained on the stem 6 by a sliding it along the splines of the splined portion 8, the tripod element being received in the barrel 20.

The tripod element 10 is maintained on the stem 6 by a circlip or by a setting or forming over (not shown) at the end of the stem 6. The sealing cap 38 is then set or formed over on the barrel 20.

Figure 2:
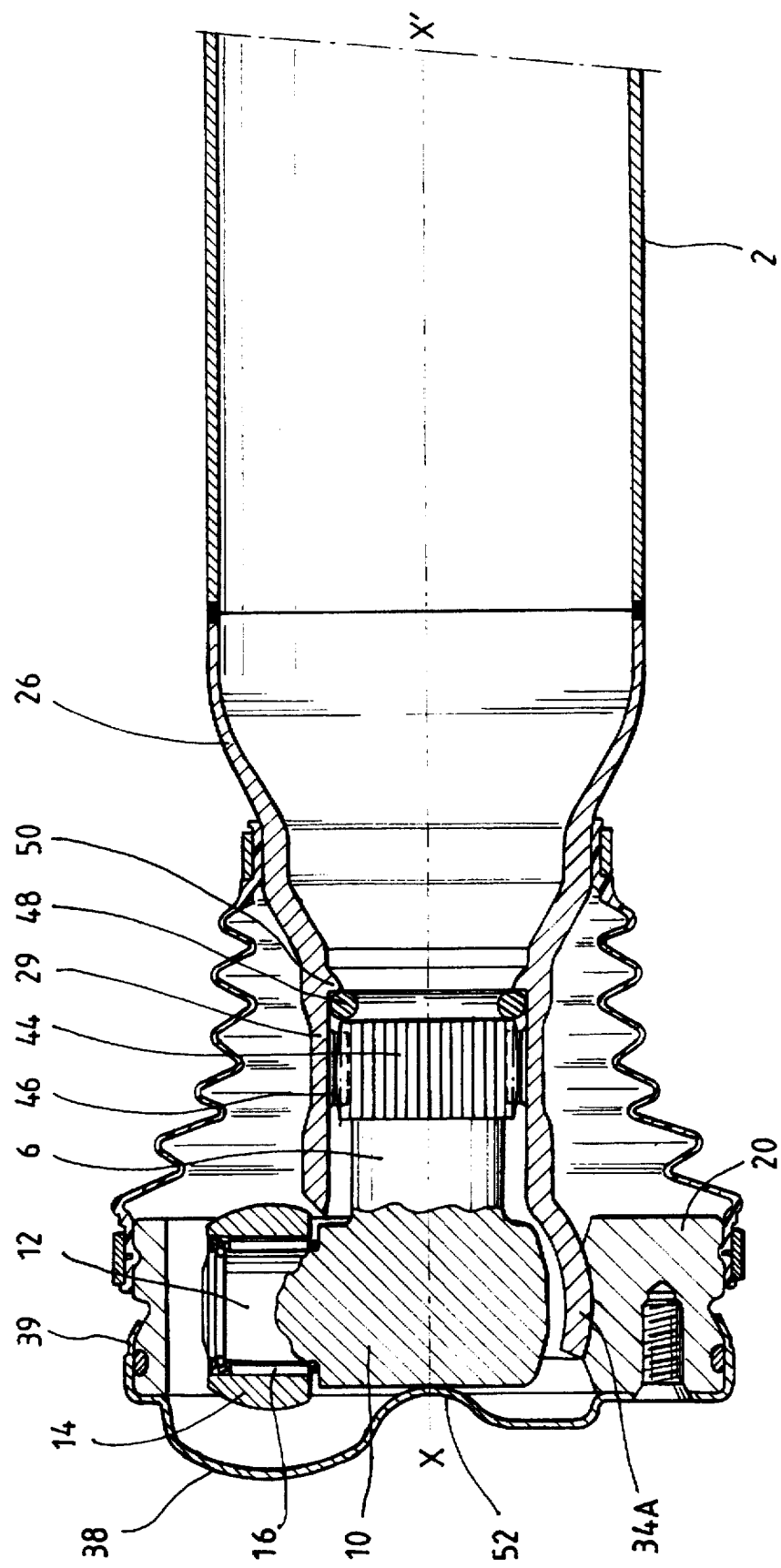
FIG. 2 is a longitudinal sectional view of a second embodiment of a joint according to the invention.

FIG. 2 shows a second embodiment of an axially fixed homokinetic tripod joint according to the invention. Elements of the joint which are identical or similar to those shown in FIG. 1 carry the same reference numerals, and only the differences relative to the first embodiment will be described.

The tripod element 10 is in one piece with the stem 6, which is short, and has at its other end a splined portion 44. This splined portion, of limited length, cooperates with a corresponding splined portion 46 provided on the inner surface of the narrowed section 29 of the sleeve 26.

The splined portion 44 of the stem 6 bears at its free end, through a thrust O-ring 48 which also affords a seal, against a shoulder 50, which is an integral part of the inner wall of the sleeve 26 in the narrowed part 29 of the latter.

The sealing cap 38, set on or formed over the lateral wall 39 of the barrel 20, has at the center a pressure-applying region 52 which exerts a resilient axial pressure on the end of the stem 6 carrying the tripod element, along the axis of the latter. This pressure-applying region 52 is obtained by inwardly deforming the cap 38 which is made from a flexible sheet. It maintains the tripod element 10 in the barrel 20 and ensures that the stem 6 bears against the ring 48.

As in the preceding embodiment, the tripod element 10 can undergo slight eccentricities relative to the barrel 20 while it transmits without vibration the rotation imparted thereto by the barrel 20 to the sleeve 26 and therefore to the tube 2, through the splined portions 44 and 46.

This joint is assembled in a manner similar to the manner of assembling the previously-described joint, the tripod element 10 and the stem 6 being inserted after the spherical end of the sleeve has been mounted in the barrel.

It will be understood that the two described embodiments may have their features combined to provide desired technological alternative embodiments.

What is claimed is:

1. An articulated homokinetic transmission joint, comprising:

a tripod element having three trunnions thereon and three rollers respectively mounted on said three trunnions;

a driving barrel defining a central cavity and comprising three pairs of raceways spaced on the periphery of said central cavity and three spherical wall portions, said driving barrel receiving said tripod element in said central cavity thereof;

a stem connected to rotate with a shaft, said stem carrying said tripod element; and a sleeve in which said stem substantially axially extends, said sleeve having a first end portion connected to said shaft and a second end portion defining an outwardly spherical bell mouth, said outwardly spherical bell mouth having three recesses defining three lugs on said outwardly spherical bell mouth for radially centering said sleeve in said central cavity of said driving barrel, said three lugs cooperating with said three spherical wall portions so as to axially position said tripod element relative to said barrel.

2. The articulated homokinetic transmission joint of claim 1, wherein said barrel comprises an open side facing away from said shaft for allowing said tripod element to be placed in said barrel when said lugs of said sleeve are engaged on said spherical wall portions of said central cavity.

3. The articulated homokinetic transmission joint of claim 2, and further comprising a removable fluid tight cap that is mounted on said barrel and covers said open side of said barrel.

4. The articulated homokinetic transmission joint of claim 3, wherein said tripod element is in one piece with said stem, one end of said stem comprises splines, another end of said stem is unsplined, said sleeve comprises complementary internal splines that are cooperative with said splines at the one end of said stem so as to interconnect said stem and said sleeve in rotation, and a means for resiliently pressing said splined end of said stem against said inner shoulder of said sleeve comprises said cap comprising an inwardly extending deformation that forms a pressure-applying region that resiliently acts on said unsplined end of said stem along the axis of said stem.

5. The articulated homokinetic transmission joint of claim 1, wherein said stem has a splined end portion and an opposite end portion that is connected to said shaft, said tripod element being carried by said splined end portion of said stem.

6. The articulated homokinetic transmission joint of claim 1, wherein said tripod element is in one piece with said stem.

7. The articulated homokinetic transmission joint of claim 6, wherein one end of said stem comprises splines, and said sleeve comprises complementary internal splines that are cooperative with said splines at the one end of said stem so as to interconnect said stem and said sleeve in rotation.

8. The articulated homokinetic transmission joint of claim 7, wherein said splines of said stem have a crowned profile that allows an angular movement of said stem relative to said sleeve.

9. The articulated homokinetic transmission joint of claim 7, and further comprising an inner shoulder in said sleeve and means for resiliently pressing said splined end of said stem against said inner shoulder of said sleeve.

10. The articulated homokinetic transmission joint of claim 9, and further comprising a circular ring interposed between said splined end of said stem and said shoulder of said sleeve.

11. The articulated homokinetic transmission joint of claim 1, wherein said three lugs have outwardly spherical surfaces thereof engaged with respective ones of said three spherical wall portions so as to axially fix said shaft with said barrel.

* * * * *